March 25, 1969 W. H. YUNG 3,434,605
UNLOADING MECHANISM FOR A STORAGE STRUCTURE
Filed Sept. 27, 1967
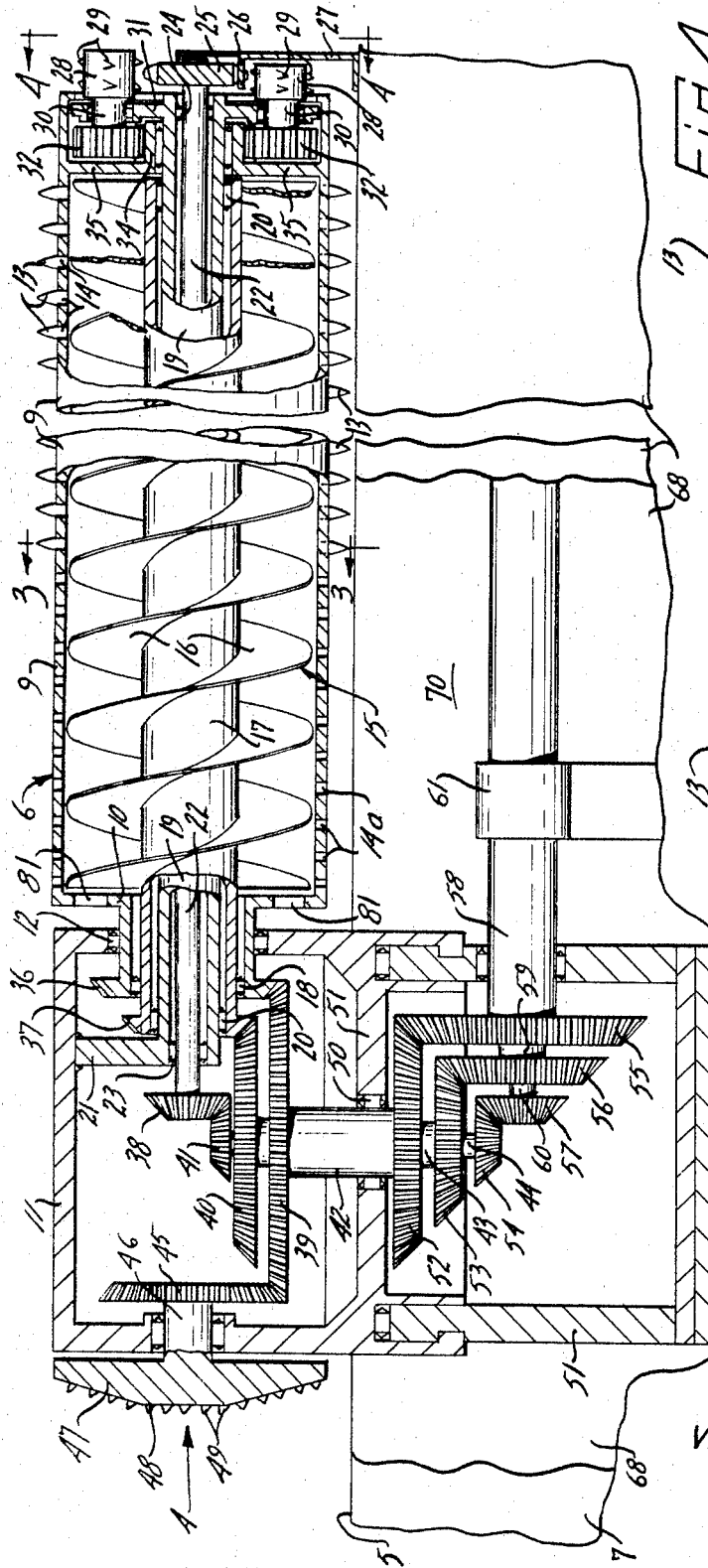
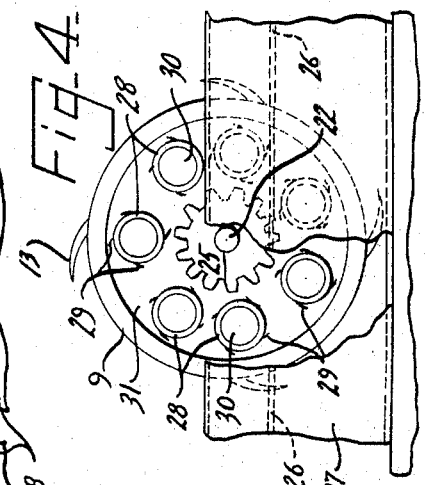
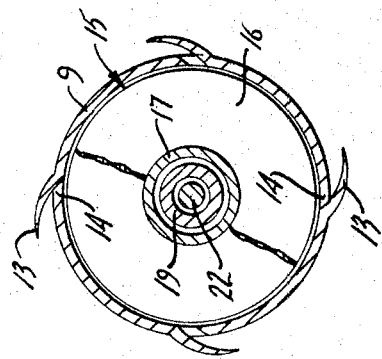
INVENTOR
WILLIAM H. YUNG
BY
Merl E Sceales
Attorney United States Patent Office 3,434,605
Patented Mar. 25, 1969

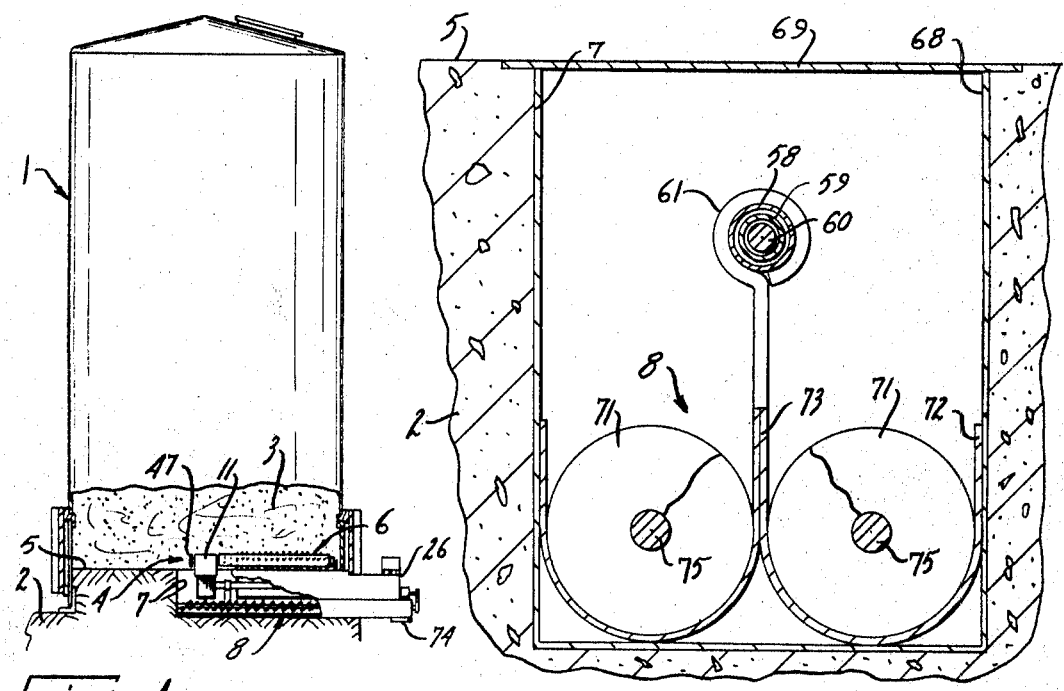
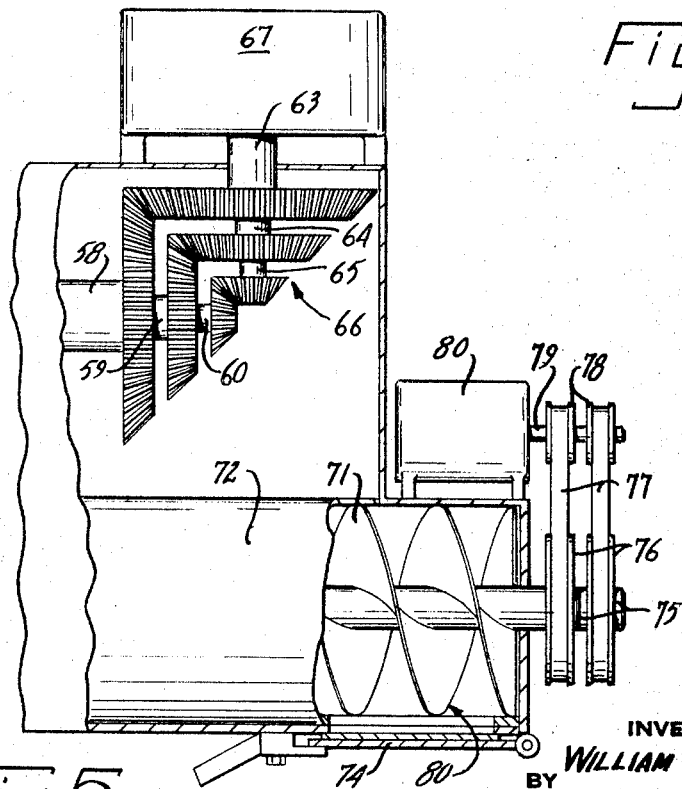

3,434,605
UNLOADING MECHANISM FOR A STORAGE
STRUCTURE
William H. Yung, Riverdale, Ill., assignor to A. O. Smith
Harvestore Products, Inc., Arlington Heights, Ill., a
corporation of Delaware
Filed Sept. 27, 1967, Ser. No. 670,936
Int. Cl. B65g 65/30, 33/00; A01f 25/00
U.S. Cl. 214—17                                      19 Claims

ABSTRACT OF THE DISCLOSURE

This invention relates to an unloading mechanism for a storage structure. A cutter arm is mounted for rotation about the center of the structure and includes an outer cylinder having a series of cutting elements which partially shroud openings in the cylinder. As the cutter arm rotates about the center of the structure, the cylinder is rotated about its axis, and the cutting elements dislodge the stored material and force the material through the openings to the interior of the cylinder. An auger operating within the cylinder conveys the dislodged material to the inner end of the cylinder where the material is discharged through openings in the cylinder wall to a conveyor unit located within a radially extending trough in the foundation of the storage structure.

---

Silage or other perishable products are frequently stored in a sealed silo or storage structure to prevent air from contacting the silage and thereby minimize spoilage. In a sealed structure, the stored material is normally removed by a bottom unloader of the type shown in the patent to Tiedemann, No. 2,835,770. With a bottom unloader of this type, a cutter arm is mounted for rotation at the center of the silo and rotates across the floor or foundation. The cutter arm carries an endless chain having teeth mounted thereon and as the cutter arm rotates, the teeth cut and dislodge the silage and move the dislodged silage toward the center of the silo where it falls into a radially extending trough. A conveyor located within the trough moves the silage to the exterior of the silo. With this type of unloading mechanism the silage is removed with a minimum exposure to the atmosphere, thereby reducing spoilage.

A chain-type cutter arm which is frequently used with a bottom unloader is satisfactory for removing fibrous materials which are generally in a hard-pack condition, but because of the articulated nature of the roller chain, including numerous links and connecting pins, the speed of travel of the chain is limited and this correspondingly limits the output or capacity of the unloader. Thus, chain-type cutter arms are generally limited to silos having a diameter of 25 feet or less.

It has also been proposed to use auger-type cutter arms in larger diameter silos or storage structures. However, the auger may tend to deflect under load and the starting torque for an auger-type cutter arm is generally high because the silage tends to pack tightly around the auger flighting when the unloader is not being used.

The present invention is directed to an improved unloading mechanism having an increased output or capacity and which is patricularly adapted for use with large diameter silos or storage structures. The unloader of the invention comprises a cutter arm which is mounted for rotation about the center of the silo, and the cutter arm includes an outer cylinder provided with a plurality of cutting elements which border and partially shroud a series of openings in the cylinder. As the cylinder rotates about its axis, the cutting elements penetrate and dislodge the stored material and force the dislodged material through the openings to the interior of the cylinder. Operating within the cylinder is an auger which serves to convey the dislodged material toward the inner end of the cylinder where the material falls through a series of unshrouded openings in the cylinder wall into a radially extending trough in the foundation. A conveyor unit operating within the trough acts to convey the dislodged material to the exterior of the storage structure.

The cutter cylinder and auger are separately driven by a drive mechanism which extends through the trough and is operably connected to the inner end of the auger and the cylinder, so that the cylinder and auger can operate independently and at different speeds.

Moreover, the cutter arm, instead of being driven from its inner end, is driven from its outer end by a drive shaft which extends within the auger shaft. The outer end of the drive shaft carries a sprocket which engages openings in a circular track located adjacent the wall of the storage structure. By driving the cutter arm from the outer end, the moment arm on the cutter arm is reduced and this correspondingly decreases the power requirements for the unloading mechanism.

As the cutter cylinder has a relatively large diameter, the beam strength of the cutter arm is substantially increased over conventional cutter arms and the cutter arm can be subjected to greater loads without deflection. Moreover, as the outer surface of the cutter cylinder is relatively smooth without undercut areas or recesses within which the silage will lodge and pack, the starting torque for the cutter arm is reduced.

As an added advantage, the cylindrical cutter can be rotated either clockwise or counterclockwise within the storage structure and this enables the cutter arm to readily break lose from compacted material.

With the cutter arm of the invention, the discharge rate is not limited to the strength of the arm since the volume capacity of discharge is proportional to the third power of the auger diameter while the beam strength of the cylinder is proportional to the fourth power of its diameter.

As the speed of both the cutter cylinder and the auger can be independently varied, the cutting and delivery rates of the unloader can be varied to obtain the optimum performance, depending upon the size of the structure and the material to be unloaded.

As a further advantage, the unloader includes an entry tool which is located diametrically opposite the cutter. The entry tool includes a head having a series of cutter teeth and the head is adapted to rotate about its axis as the unloading unit is installed within the silo. As the unloading unit is installed, the entry tool cuts a path into the silage mass and the cut silage falls downwardly into the trough where it is conveyed to the exterior of the silo by the conveyor.

The present unloader also eliminates the inherent problems which are encountered with the use of long, endless cutter chains, due to the fact that the chain contains numerous links, pins and other moving parts. The unloader of the invention not only decreases the cost by reducing the number of moving parts, but also eliminates many points of potential wear and problems of clogging, jamming or freezing of the chain elements.

Other objects and advantages will appear in the course of the following description.

The drawings illustrate the best mode presently contemplated of carrying out the invention.

In the drawings:

FIGURE 1 is a side elevation with parts broken away of a silo incorporating the unloading mechanism of the invention;

FIG. 2 is an enlarged vertical section, with parts broken away, of the cutter arm;

FIG. 3 is a transverse section taken along line 3—3 of FIG. 2;

FIG. 4 is an end view of the cutter arm taken along line 4—4 of FIG. 2;

FIG. 5 is a side elevation, with parts broken away, of the outer end of the unloader mechanism; and FIG. 6 is a transverse section taken through the conveyor trough in the foundation.

The drawings illustrate a storage structure or silo 1 which is mounted on a foundation 2 and is adapted to contain a stored material 3 such as silage or the like. The stored material 3 is removed from the silo 1 by an unloader unit 4 that is mounted above the floor 5 of the silo.

The unloader unit 4, in general, includes a silage dislodging unit or cutter arm 6 mounted for rotation at the center of the silo. The arm 6 operates to cut and dislodge the silage and move the dislodged silage to the center of the silo where it is delivered to a radially extending trough 7 formed in the foundation 2. A conveyor unit 8 mounted within the trough 7 serves to convey the dislodged silage to the exterior of the silo.

The cutter arm 6 includes an outer hollow cylinder 9, having a hub portion 10 at its inner end which is journaled within an opening in central housing 11 by a bearing assembly 12. The outer surface of cylinder 9 is provided with a series of teeth 13 which extend outwardly from the surface of the cylinder and partially shroud or enclose a series of openings 14 in the cylinder wall. The teeth 13 are formed integrally with the cylinder wall 9 and each tooth tapers to a generally pointed tip which faces in the direction of rotation of the cylinder and serves to penetrate and dislodge the stored material. The teeth 13 and the openings 14 are arranged on the cylinder 9 so that, as the cylinder 9 rotates about its axis, all portions of the silage mass ahead of the cutter arm will be engaged by a tooth 13 as the cylinder rotates. The teeth 13 are not arranged in any specific pattern and the teeth can either be arranged generally spirally on the cylinder 9 or one or more teeth can be located on transverse planes extending through the cylinder.

As the cylinder 9 rotates around its axis, the pointed tips of the teeth 13 act to penetrate into the silage or stored material, dislodging the same, and forcing the dislodged material through the openings 14 into the interior of the hollow cylinder 9.

Operating within the interior of the cylinder 9 is an auger 15 which serves to convey the dislodged material inwardly toward the inner end of the cylinder 9. Auger 15 includes a spiral flight 16 which is secured to a central hollow shaft 17. As shown in FIG. 2, the inner end of the shaft 17 is journaled within the hub 10 by a bearing assembly 18. The hollow auger shaft 17 is journaled for rotation about a fixed tube 19 by a pair of bearing assemblies 20, and the tube 19 is supported at its inner end from housing 11 by a supporting bracket 21.

A drive shaft 22 is journaled for rotation within the fixed tube 19 by a pair of bearing assemblies 23 and 24. As best shown in FIG. 2, the outer end of drive shaft 22 projects outwardly beyond the outer end of the fixed tube 19, and the shaft carries a sprocket 25 which engages a series of openings in a circular track 26 mounted adjacent the wall of the silo 1. The track 26 is supported from the floor 5 by a bracket 27. As the drive shaft 22 rotates, the sprocket 25 successively engages the openings in the track 26 to thereby drive the cutter arm 6 around the center of the silo. As the cutter arm 6 is rotated around the silo, the cylinder 9 and the auger 15 simultaneously rotate about the axis of shaft 22.

To prevent the silage or other stored material from packing around the track 26 or sprocket 25, a series of cutters 28 are arranged in a circular pattern around the sprocket 25. Each of the cutters 28 is provided with a series of teeth 29 which serve to engage and loosen the silage in the area above and below the track 26. Each of the cutters 28 is adapted to rotate about its axis, and to provide this rotation, each cutter is mounted on a horizontal shaft 30, which is journaled within an opening in plate 31 mounted on the end of the fixed tube 19. The inner end of each shaft 30 carries a gear 32 and the gears 32 are located within a recess in the end of the cylinder 9 and are adapted to be driven simultaneously by a large gear 34 mounted on transverse wall 35 at the end of the cylinder 9. As the cylinder 9 rotates about its axis, the gear 34 will rotate to thereby drive the individual gears 32 which correspondingly serve to rotate the small track clearing cutters 28.

The cylinder 9, auger 15 and drive shaft 22 are all driven by a drive mechanism which extends through the trough 7. As best shown in FIG. 2, the hub 10, auger shaft 17 and shaft 22 are provided with bevel gears 36, 37 and 38 respectively, and the gears 36, 37 and 38 are driven by complementary bevel gears 39, 40 and 41 which are secured to concentric vertical shafts 42, 43 and 44 respectively. In addition, the bevel gear 39 is adapted to drive a second bevel gear 45 secured to horizontal shaft 46. As shown in FIG. 2, the shaft 46 is disposed in alignment with the shaft 22 and carries an entry tool indicated generally by 47. Tool 47 includes a generally dome-shaped head 48 having a series of teeth 49. As the unloading mechanism is installed within the mass of silage, the entry tool is rotated, which cuts a path through the silage mass and thereby facilitates the entry of the unloading mechanism in the silo or storage structure.

The vertical shafts 42, 43 and 44 are journaled one within each other by conventional bearing assemblies not shown, and the outer shaft 42 is journaled within a bearing assembly 50 which is mounted in the lower wall of housing 11. As shown in FIG. 2, the housing 11 is journaled on the upper end of the stationary housing 51, which is located within the central portion of trough 7, and rotates in accordance with rotation of the cutter arm 6.

The lower ends of vertical shafts 42, 43 and 44 carry bevel gears 52, 53 and 54 respectively, which are driven by bevel gears 55, 56 and 57, mounted on horizontal shafts 58, 59 and 60, respectively. Shafts 58, 59 and 60 are journaled one within the other with the outer shaft 58 being journaled in bearing assembly 61. Shafts 58, 59 and 60 extend within the trough 7 to a housing 62 shown in FIG. 5, which is located on the exterior of the silo 1 and forms an extension of the trough 7.

Horizontal shafts 58, 59 and 60 are driven by vertical drive shafts 63, 64 and 65 acting through a bevel gear unit indicated generally by 66. A motor and speed reducing unit 67 mounted on housing 62 serves to individually drive the vertical shafts 63, 64 and 65 through a conventional drive mechanism. Each of the shafts 63, 64 and 65 is individually driven so that the cylinder 9, auger 15 and drive shaft 22 can all be individually operated at the desired speed. Normally the auger 15 is driven at a higher rate of speed than the cutter cylinder 9 so that the material being dislodged will be delivered to the conveyor unit 8 without jamming or backing up.

As best shown in FIG. 6, an open top, generally rectangular trough member 68 is located within the trough 7 and the housing 51 is mounted on the side walls of the trough member 68. The outer portion of the trough member 68 is enclosed by a plate 69 which extends across the trough and is mounted flush with the floor 5 of the foundation 2. The plate 69 terminates in spaced relation to the center of the silo so that the central portion of the trough member 68 is open and the dislodged material can be discharged by the cylinder 9 through the opening 70 to the conveying mechanism 8 operating within the trough member 68.

The conveying mechanism 8 comprises a pair of parallel augers 71 which are mounted for rotation within an open-top housing 72 located within trough member 68. The central portion of the housing 72 extends upwardly between the augers 71 to define a divider wall 73, and the bearing assemblies 61 which journal the shaft 58 for rotation are carried by the divider wall 73.

The augers 71 are rotated about their axes to move the dislodged silage outwardly into the housing 62 where it is discharged through an opening in the bottom of the housing which is normally enclosed by a hinged or removable door 74, as shown in FIG. 5.

To drive the augers 71, the auger shafts 75 extend through the rear wall of the housing 62 and each shaft 75 carries a pulley 76. The pulleys 76 are connected by belts 77 to pulleys 78 on drive shaft 79 of motor and speed reducing unit 80. Thus, rotation of the drive shaft 79 acts to rotate the augers 71 within the housing 72 to move the dislodged material to the exterior of the silo.

In operation, the motor and speed reducing unit 67 operates to drive the shafts 63, 64 and 65 and rotation of the shafts acts through the several bevel gear units to rotate the cutter cylinder 9, the auger 15 and also drive the shaft 22. As previously mentioned, rotation of shaft 22 drives the sprocket 25 along the track 26 to thereby rotate the cutter arm 6 about the center of the silo. Simultaneously the cylinder 9 is rotated about its axis and the teeth 13 penetrate and dislodge the stored material. Due to the arrangement of the teeth 13 and the openings 14, the dislodged material is forced or extruded through the openings 14 into the interior of the cylinder 9 where it is conveyed inwardly by the auger 15 toward the inner end of the cylinder 9. The stored material is discharged from the cylinder 9 through a series of openings 81 formed in the end wall of the cylinder and through a series of the openings 14a located adjacent the inner end of the cylinder. The openings 14a are unshrouded, not bordered by the teeth 13, so that the silage can readily pass through the openings 14a and fall into the trough 7 where it is conveyed by the augers 71 to the exterior of the silo.

The use of the relatively large diameter cutting cylinder 9 increases the beam strength of the cutter arm 6 and enables the cutter arm to take substantial load without deflection. The cutter arm has an increased output or capacity as compared with conventional cutter arms and is therefore particularly adapted for use with large diameter silos or storage structures.

As the cutter arm can be rotated either clockwise or counterclockwise, the unit has the ability to break readily loose from compacted material.

With the unloading mechanism of the invention the cutter cylinder 9 and auger 15, as well as the drive shaft 22, are operated independently and the speeds of these members can be varied by changing the gear ratios. This enables the cutting and delivery ratio to be varied, depending on the size of the storage structure and the particular material being unloaded.

As the cutter arm is driven from its outer end rather than its inner end, the moment arm on the cutter arm is reduced, thereby enabling the unloading mechanisms to be used with larger diameter storage structures.

While the above description has been directed particularly to an unloading unit for use with a silo, it is contemplated that the unloading unit of the invention can be employed to unload any type of bulk material from a storage structure.

I claim:

1. A material gathering arm mounted for rotation about a vertical axis within a storage structure and disposed to dislodge stored material and deliver the dislodged material to a conveyor unit for discharge too the exterior of the structure, comprising a tubular member mounted for rotation about a vertical axis within the structure and having a plurality of openings therein, means for rotating said tubular member about its axis, a series of dislodging members disposed on the outer surface of the tubular member and disposed to penetrate and dislodge the stored material as said tubular member rotates about its axis, said dislodging members being arranged to deliver the dislodged material through said openings to the interior of said tubular member, conveying means disposed within the tubular member and disposed to convey the dislodged material toward the inner end of said tubular member, and means for discharging the dislodged material from the inner end of the tubular member to said conveyor unit.

2. The structure of claim 1, wherein said conveying means comprises an auger mounted for rotation within said tubular member.

3. The structure of claim 1, wherein said dislodging members comprise a series of teeth extending outwardly from said tubular member and terminating in generally pointed tips adapted to penetrate said stored material.

4. The structure of claim 3, wherein said teeth border and partially shroud said openings in said tubular member.

5. The structure of claim 2, wherein said auger is provided with a generally hollow shaft and a drive shaft extends within said auger shaft, said arm also including a driving member operably connected to the outer end of said drive shaft for rotating said arm about said vertical axis.

6. The structure of claim 5, wherein said driving member comprises a sprocket carried by the outer end of said drive shaft, and adapted to engage a generally circular track mounted adjacent the wall of the storage structure.

7. The structure of claim 2, wherein said auger shaft is hollow, said arm also including a fixed tube mounted within said auger shaft, and means for journaling the auger shaft around said tube.

8. The structure of claim 7, and including a drive shaft journaled within said fixed tube, and drive means operably connected to the outer end of the drive shaft for rotating said arm about said vertical axis.

9. In a mechanism for unloading a stored material from a storage structure, a hollow member mounted for rotation about a vertical axis within the structure and having a series of discharge openings disposed adjacent the inner end and having a series of inlet openings located longitudinally outward of said discharge openings, a series of dislodging members disposed on the outer surface of the hollow member and disposed to penetrate and dislodge the stored material as the hollow member rotates about its axis, said dislodging members being arranged to deliver the dislodged stored material through said inlet openings to the interior of said hollow member, conveying means disposed within the hollow member and disposed to convey the dislodged material toward the inner end of said cylinder with said material being discharged through said discharge openings to a conveying unit, and drive means for rotating said hollow member about its axis and for driving said conveying means.

10. The structure of claim 9, wherein said dislodging members are teeth extending circumferentially outward from said hollow member and terminating in generally pointed tips adapted to penetrate the stored material.

11. The structure of claim 5, and including a series of cutters located in the common vertical plane with said drive member and spaced circumferentially around said drive member.

12. The structure of claim 11, and including drive means interconnecting said tubular member and said cutters for driving said cutters in accordance with rotation of said tubular member.

13. The structure of claim 5, and including a fixed tube disposed concentrically between said auger shaft and said drive shaft, a series of cutters spaced circumferentially around said drive member, means for journalling each of said cutters for rotation with respect to said fixed tube, and means for driving each of said cutters about its axis.

14. In an unloading unit for unloading a stored material from a storage structure, material dislodging and gathering means disposed to rotate about a vertical axis within the structure and comprising a cylinder mounted for rotation about a vertical axis within the structure and having a series of discharge openings located adjacent the inner end of said cylinder and having a plurality of inlet openings located longitudinally outward of said discharge openings, a series of dislodging members disposed on the outer surface of the cylinder and disposed to penetrate and dislodge the stored material as the cylinder rotates about its axis, said dislodging members bordering said inlet openings and arranged to deliver the stored material through said openings to the interior of said tubular member, an auger disposed within the interior of said cylinder and including a hollow auger shaft, a fixed tube disposed within the auger shaft, said auger shaft being journalled around said tube, a drive shaft journalled within said fixed tube, and a driving member carried by the outer end of said drive shaft and adapted to drive said dislodging means in a circular path about said vertical axis, and drive means for independently rotating said cylinder, said auger shaft and said drive shaft about their axes.

15. The structure of claim 14, and including an entry tool disposed opposite said cylinder, said drive means being operably connected to said entry tool to rotate said tool about its axis.

16. The structure of claim 15, wherein said entry tool includes a series of teeth adapted to penetrate and dislodge the stored material as the unloading mechanism is installed within the storage structure.

17. The structure of claim 14, and including a generally circular track mounted adjacent the wall of the storage structure and disposed to be engaged by the drive member to thereby drive the dislodging means about said vertical axis.

18. The structure of claim 17, and including a series of rotatable cutters disposed in a common vertical plane with said drive member and circularly spaced about said drive member, said cutters being located above and below said track.

19. The structure of claim 18, and including an end wall secured to the outer end portion of said fixed tube, and means for journalling said cutters within said end wall.

References Cited

UNITED STATES PATENTS 1,401,155   12/1921   Jacoby _____ 198—213

ROBERT G. SHERIDAN, *Primary Examiner.*

U.S. Cl. X.R.

198—213